Figure 3:
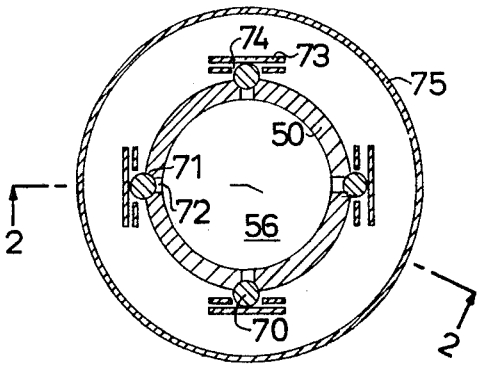
Figure 2:
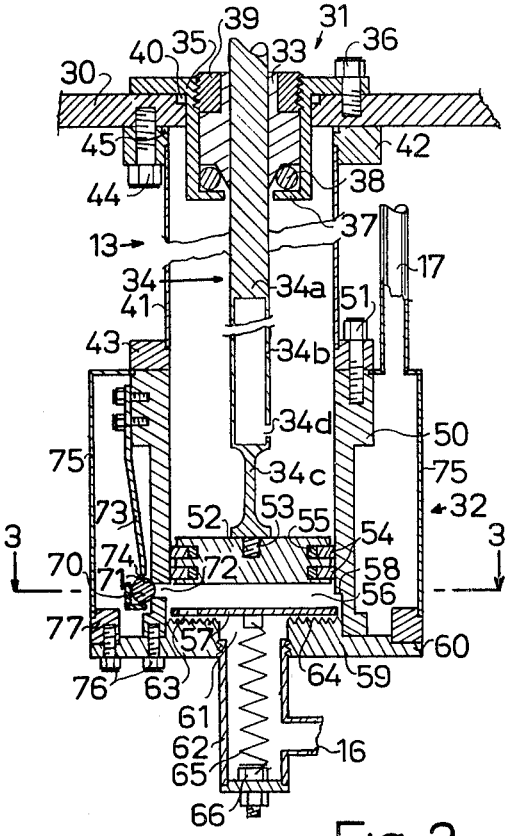
Figure 1:
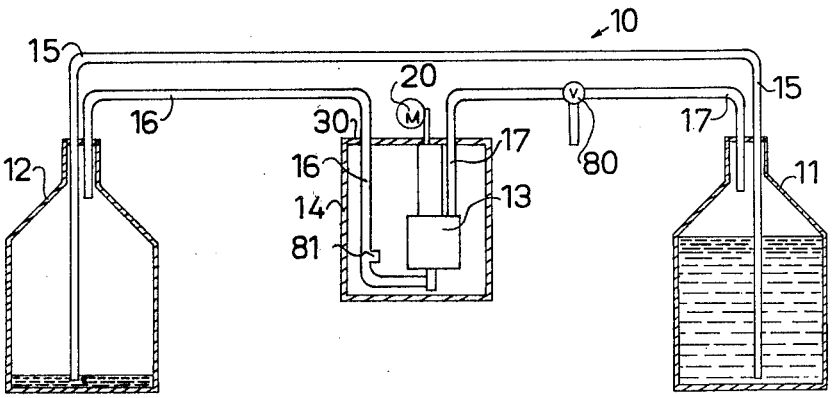

United States Defensive Publication [19] (H) [11] T976,001

Schuck [43] Nov. 7, 1978

[54] LIQUID CRYOGEN TRANSFER SYSTEM

[76] Inventor: Thomas W. Schuck, 34 Old Orchard Dr., Easton, Pa. 18042

[21] Appl. No.: 856,831

[22] Filed: Dec. 2, 1977

Related U.S. Application Data

[63] Continuation of Ser. No. 754,751, Dec. 27, 1976, abandoned.

[51] Int. Cl.[2] ..... F17C 7/02

[52] U.S. Cl. ..... 62/55; 137/210; 141/60; 417/901

[57] ABSTRACT

A system and method are provided for transferring a liquid cryogen from a supply tank to a receiver tank by pressurizing the supply tank with cold vapor from the receiver tank. This method minimizes heat added to the transferred liquid and minimizes the temperature of the vapor returned to the supply tank, making it particularly useful for optimizing the transfer of liquid cryogens such as helium, hydrogen, nitrogen and oxygen which vaporize well below ambient temperatures. A cold vapor pump is provided which is insulated from ambient temperatures for pumping the cryogen vapor from the receiver tank to the supply tank with a minimum of heat input.

16 Claims, 1 Sheet Drawing,

19 Pages Specification

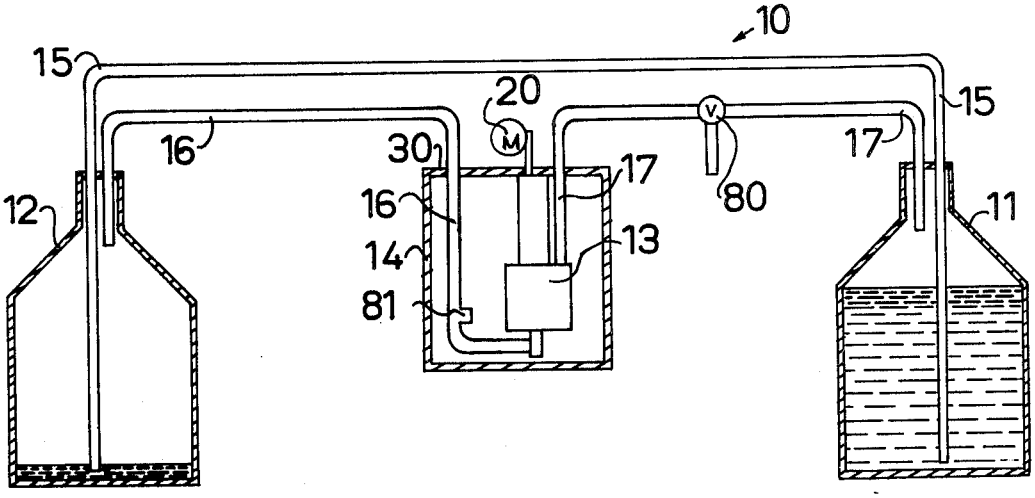

The file of this unexamined application may be inspected and copies thereof may be purchased (849 O.G. 1221, Apr. 9, 1968).